United States Patent [19]

Marshall et al.

[11] Patent Number: 5,070,760
[45] Date of Patent: Dec. 10, 1991

[54] PNEUMATICALLY ACTUATED MULTIPLE STORE LAUNCHER

[75] Inventors: Frank P. Marshall, Penns Park; Bruce W. Travor, Holland, both of Pa.

[73] Assignee: The United States of America as represented by the Secretary of the Navy, Washington, D.C.

[21] Appl. No.: 605,902

[22] Filed: Oct. 30, 1990

[51] Int. Cl.⁵ .............................................. B64D 1/04
[52] U.S. Cl. .................................. 89/1.51; 244/137.4
[58] Field of Search .......................... 244/137.1, 137.4; 89/1.56, 1.57, 1.51

[56] References Cited

U.S. PATENT DOCUMENTS

| | | | |
|---|---|---|---|
| 3,240,200 | 3/1966 | Jones | 89/1.51 |
| 3,662,645 | 5/1972 | Thurston et al. | 89/1.51 |
| 4,164,887 | 8/1979 | Ouellette | 89/1.51 |
| 4,263,835 | 4/1981 | Dragonuk | 89/1.51 |
| 4,444,085 | 4/1984 | Dragonuk | 89/1.51 |

Primary Examiner—David H. Brown
Attorney, Agent, or Firm—James V. Tura; James B. Bechtel; Susan E. Verona

[57] ABSTRACT

A multi-store launcher receives initial power from a pneumatic source. The air pressure causes a shear pin to fail, thereby allowing a firing pin to ignite a gas-generation cartridge. The gas pressure is channelled to the appropriate store, which is then discharged.

9 Claims, 3 Drawing Sheets

PNEUMATICALLY ACTUATED MULTIPLE STORE LAUNCHER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention discloses a pneumatically actuated, multi-store dispenser wherein a discharge of gas causes sequential launching of stores from their tandem position inside a launch container. In some environments, it is desirable to dispense multiple stores, for instances sonobuoys, in dense patterns from a launch vehicle that carries an abundant supply of pneumatic gas. Due to physical limitations of space in the dispensing vehicle, an effort was made to miniaturize the active components inside the store and therefore reduce the overall outer dimensions thereof. Once the size of the store was reduced, in order to meet the demands of the denser patterns, the inside of the individual launch containers were modified to allow each to hold and dispense more than one store. This new type of launch container, in addition to maintaining the size requirement dictated by the transporting vehicle, is powered by the vehicle's pneumatic system.

SUMMARY OF THE INVENTION

It is therefore an object of the present invention to provide from a standard-size launch container a multi-store laucher for launching, sequentially, a plurality of stores swherein said launcher is adaptable to presently existing transporting vehicles.

It is another object of the present invention to provide a multi-store launcher that is able to use pneumatic pulses from the transporting vehicle to sequentially activate individual gas cartridges carried adjacent each store to launch each store.

It is still another object of the present invention to provide said multi-store launcher, which uses the vehicle's pneumatic supply without making significant alterations to the standard-size launch container.

These and other objects and advantages of the present invention are achieved by providing a standard size, tubular launch container with a control module at its breech end and a plurality of gas flow channels leading therefrom to individual store assemblies, each sequentially stacked inside the container by pressure-resistant plates. The control module contains an input pipe to carry the pressurized gas from the transporting vehicle into a plenum chamber. At the floor of the chamber, a plurality of apertures open, each, to channels leading to unique locations in the container. Each aperture has a spring-loaded cap connected to a shear pin, which in turn, holds a firing pin. Each shear pin carries a fault that will cause it to fail under a predetermined load. Pressurized gas will break a shear pin and send the firing pin into a squib alongside a gas-generating cartridge. The cap will be forced shut and the subsequent gas generation is sufficient to force a store out of its position in the container. Subsequent pneumatic pulses will cause failure of the remaining shear pins and the process will be repeated for as many stores as remain.

BRIEF DESCRIPTION OF THE DRAWINGS

FIG. 3 is a plan view of the control module taken along lines III—III of FIG. 2;

DETAILED DESCRIPTION OF THE PREFERRED EMBODIMENT

Figure 1:
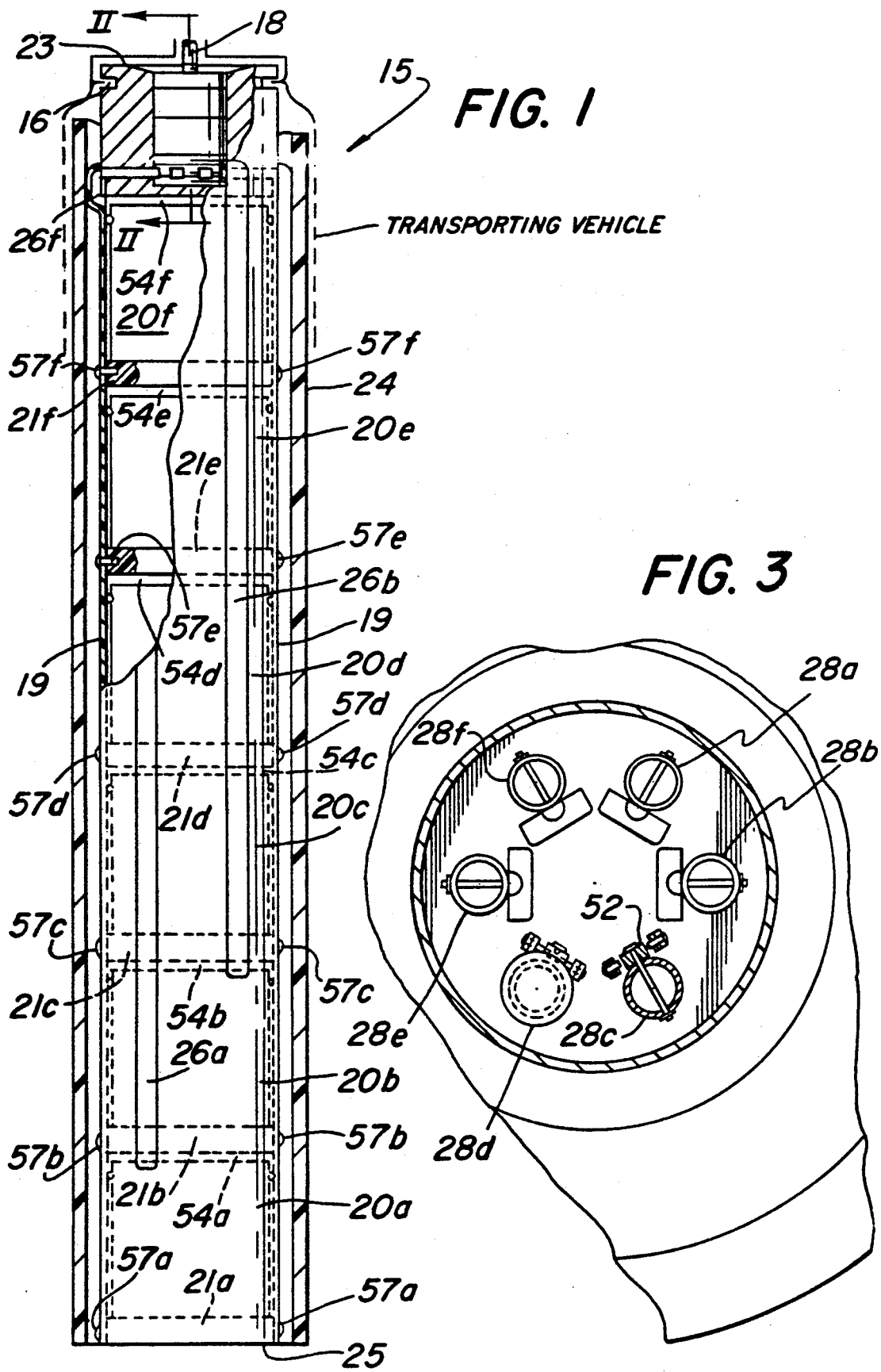
FIG. 1 shows a longitudinal view, partially cross-sectioned, of the pneumatic multi-store launcher.

Referring now to the drawings wherein like numbers designate like parts throughout the several views, FIG. 1 shows a longitudinal view of a pneumatically actuated multiple store launcher 15 with portions cut away to show better detail. Launcher 15 is a tubular container that connects into standard pneumatic air supply ports on an aircraft (or other vehicle, as shown in phantom) at attachment flange 16 and with connector 18 to supply pressurized air through the opening at the breech end 23, as is known. Stores 20a, 20b, 20c, 20d, 20e and 20f, such as sonobuoys, are packed inside launcher 15, each adjacent a respective release means 21a-f, respectively, for sequential discharge through the discharge end 25 of launcher 15. Launcher 15 can be made from any lightweight, but strong and rigid material, such as ABS plastic or aluminum, and has an outer shell 24 surrounding an inner tube 19 with a plurality of flow channels 26a-f leading from control module 22 to each of the individual stores 20a-f.

Figure 2:
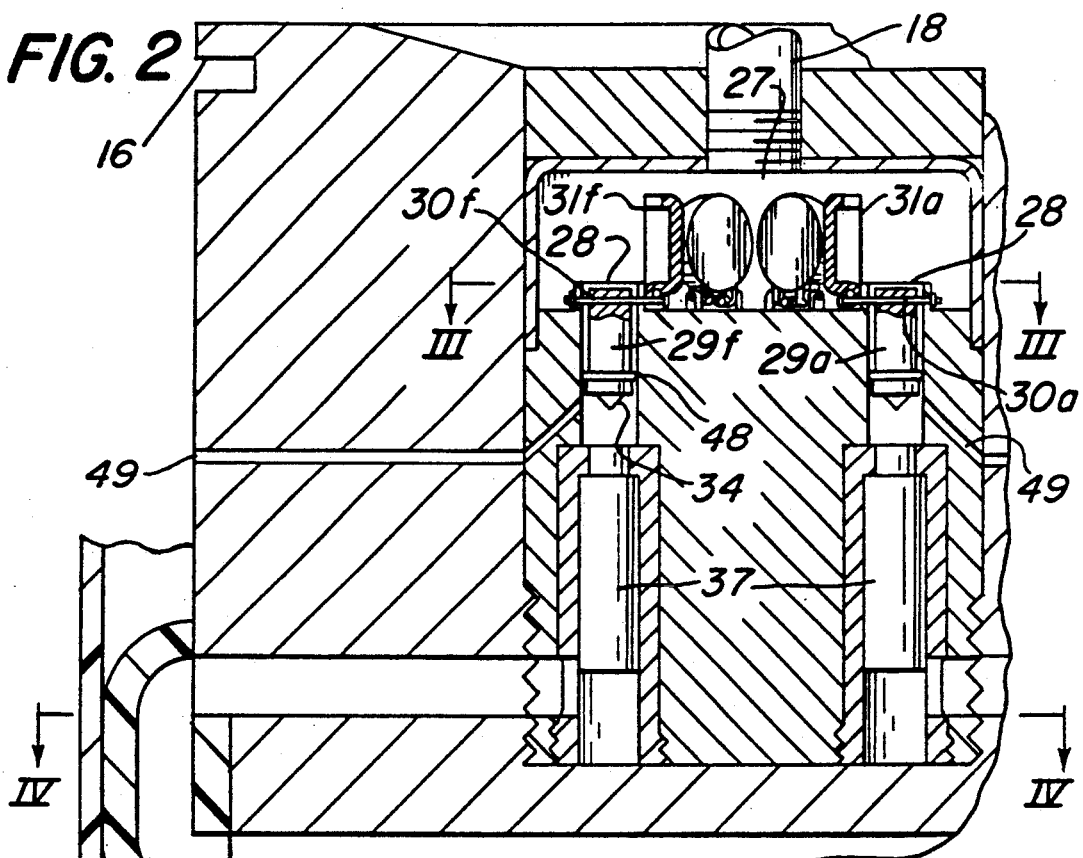
FIG. 2 is a fragmentary, enlarged cross-sectional view of the launcher taken along lines II—II of FIG. 1, showing details of the launch control module.

FIG. 2 shows a fragmentary, enlarged cross-sectional view of launcher 15 taken along lines II—II of FIG. 1, showing details of launch control module 22. A pneumatic pulse is fed through connector 18 into control module 22, and enters a plenum chamber 27. The pulse is of a predetermined strength, such as 70 psi, and enters chamber 27 where it will impact upon a plurality of bores 28a-f (seen in plan view in FIG. 3). Each bore 28 contains a firing pin device 29a-f (only 29a and f shown in FIG. 2) frangible shear pin 30a-f (ony 30a and f shown in FIG. 2) and has a spring-biased sealing cap 31a-f (only 31 and f shown in FIG. 2) hingedly fixed adjacent thereto. Directly beneath the pointed end 34 of each firing pin device 29a-f is a percussion type gas generating cartridge 37, such as those made by the ICI Aerospace Company. In the following description, reference will be made to only one of the plurality of firing mechanisms, although all of them are identical in construction and operation.

As mentioned, each bore or aperture 28 carries a firing pin 29 suspended from a frangible shear pin 30, carried in the sides thereof, designed to fracture on either side of pin 30 upon receiving a prespecified pressure. Each pin 30 is held, at its distil end 40, by a clip 41, such as a tru-arc clip that fastens around the perimeter of pin 30. The opposite end thereof is capped by a small disk 43, which provides a resting place for hinge stop 45. Each bore 28 has, hingedly fixed on hinge pin 47, a cap 31, that when open, allows the free flow of pressurized air into bore 28, and when closed, seals off bore 28. Hinge pin 47, and cap 31, are supported by a stand 49 of appropriate height and distance from bore 28 to ensure complete coverage thereof when cap 31 closes. Cap 31 is biased to the closed position by a spiral-wound spring 52 wrapped around hinge pin 47, as is known. As can be seen in FIG. 2, as long as shear pin 30 and disk 43 remain an integral unit, held in place by clip 41, hinge stop 45 will rest against disk 43, thereby forcing cap 31 to remain open.

Figure 4:
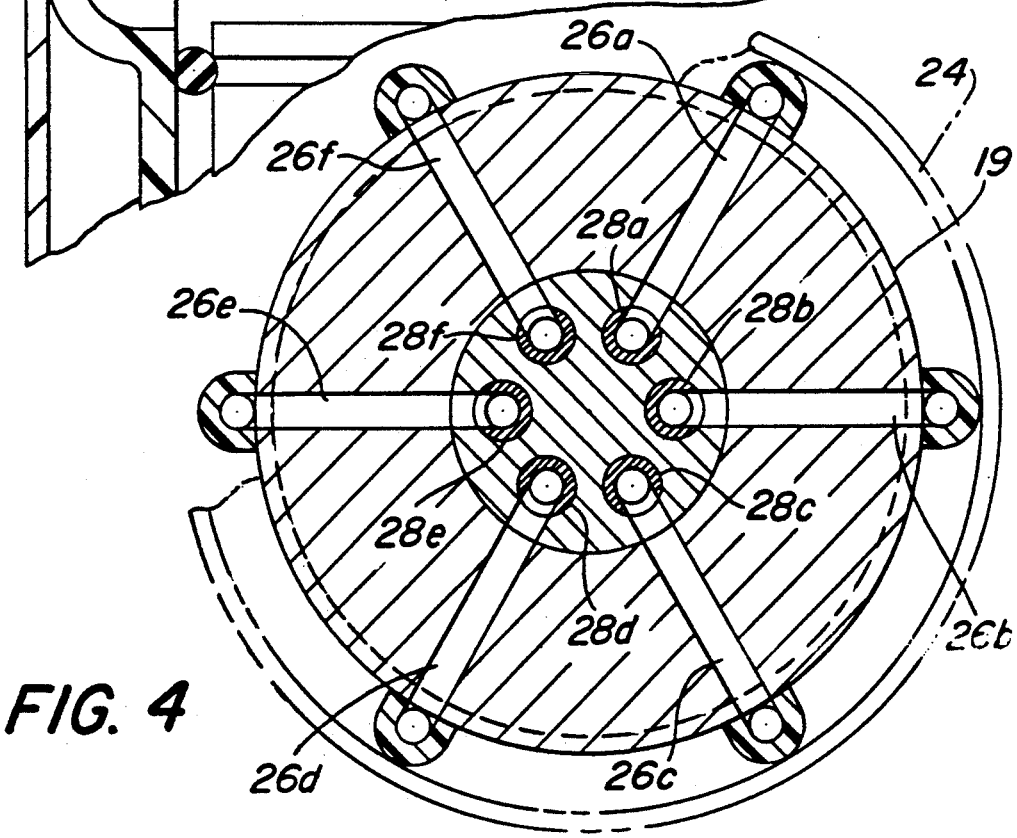
FIG. 4 is a cross-sectional view of the launcher taken along lines IV—IV of FIG. 2.
Figure 5:
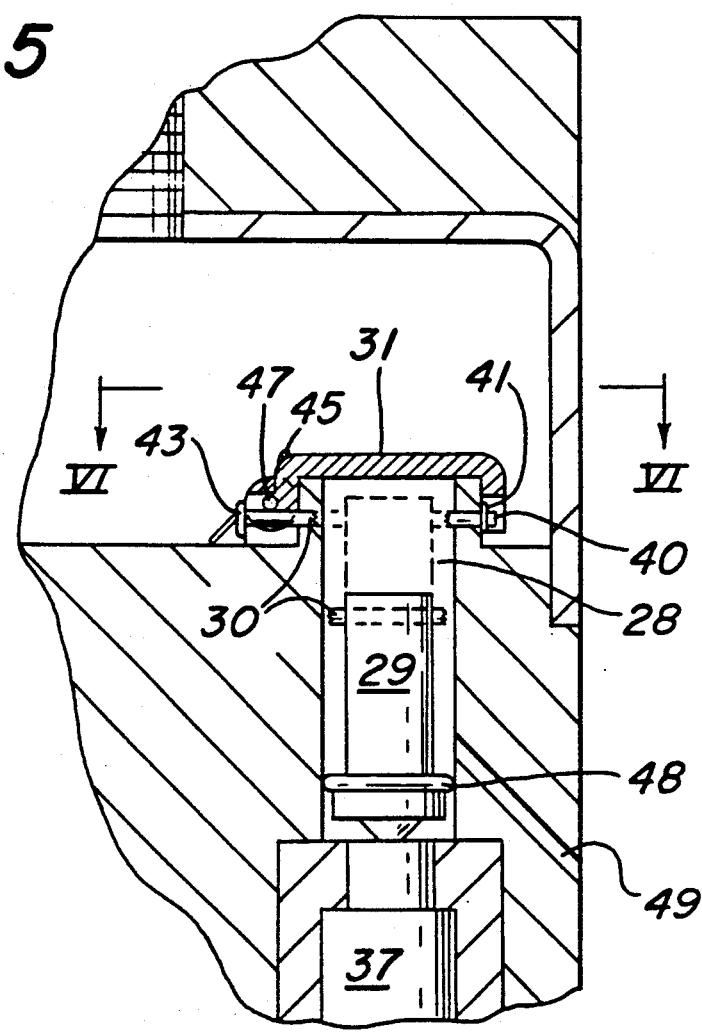
FIG. 5 is an isolated detail view of one of the cap-closure mechanisms inside the launch control module.
Figure 6:
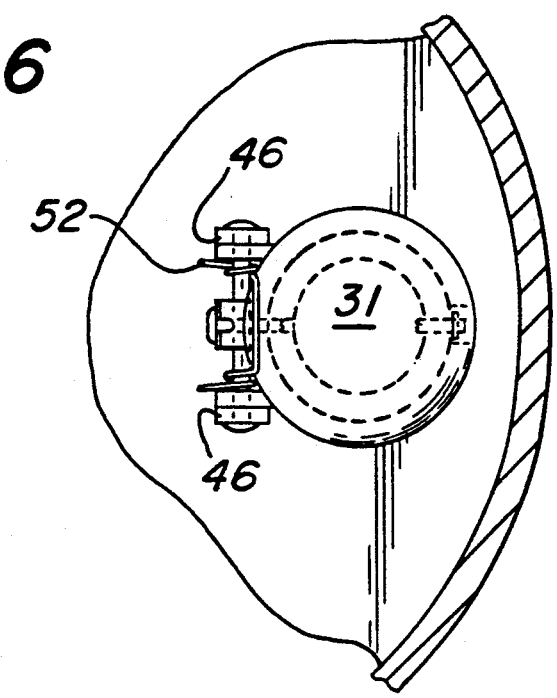
FIG. 6 is a cross-sectional view of the closure mechanism taken along lines VI—VI of FIG. 5.

As seen in FIGS. 2 and 5 firing pin 29 has, around its perimeter adjacent end 34, a pressure seal 48 in the form of a thin rubber or plastic washer. Immediately below seal 48 is a small-diameter, pressure-relief bore 49, for a purpose to be described. As seen, the diameter of bore 28 is reduced to accommodate, by a close-fitting relationship, gas-generating cartridge 37. FIG. 4, a plan view of launcher 15 taken along lines IV—IV, shows that each of bores 28a-f leads to a distinct flow channel 26a-f. As mentioned, each flow channel ends at an aperture (not seen in FIG. 1) extending through the wall of inner tube 19 into a unique one of several chambers 54a-f, adjacent stores 20a-f.

OPERATION

The pneumatically-activated multiple store launcher 15 receives air pulses, within predetermined limits, from the transporting vehicle, such as an aircraft, through connector 18. The initial pulse is received in chamber 27 and immediately results in an increasing force being exerted on firing pins 29. This force is transferred to frangible shear pins 30, which are preformed to break at differing, prescribed amounts. Upon reaching that prescribed pressure, pin 30 will fracture at both sides of firing pin 29 and pin 29 will smash into the primer portion of cartridge 37 with sufficient force to ignite it. Simultaneously, with the fracturing of shear pin 30, the stored spring force in spring 52, acting to close cap 31, will cause hinge stop 45 to force disk 43 and the remainder of pin 30 out of the way, thereby allowing sealing cap 31 to fittingly close over bore 28.

As firing pin 29 impacts the primer portion of cartridge 37, the end 34 becomes wedged into the reduced diameter section of bore 28, thereby forcing the gas charge generated by cartridge 37, which may contain, for instance, barium styphnate and related gas producing substances, to follow flow channel 26 to chamber 54. Simultaneously, excess pressure will bleed off through bore 49. Each store 20 is releasably held in its space inside launcher 15 by a pair of small shear pins 57 forced through the sides of inner tube 19 and into pressure plates or release means 21a-f as is known. The gas charge from cartridge 37 is of sufficient force to cause a store 20 to break its set of small shear pins 57 and eject through discharge end 25. The sequencing of firing is designed so that the weakest pin 30 is placed in bore 28a, which causes the first charge to eject store 20a first. Subsequent stores are ejected in like manner.

Finally, while the pneumatically-actuated multiple store launcher has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

What we claim is:

1. A multi-store launcher that uses pneumatic pressure to discharge, sequentially, store assemblies packed therein, comprising:
   a. a launch container for sequentially holding in unique chambers a plurality of stores and being removeably fastened to a transporting vehicle, and having at its breech end means to receive pressurized gas;
   b. a plurality of flow means, connected to said means to receive each leading to a distinct and separate chamber;
   c. a plurality of firing pin means located one in each of flow means to receive pressurized gas; and
   d. a plurality of gas discharge means located one each adjacent said firing pin means to generate a gas discharge and eject a store from said container.

2. A multi-store launcher as described in claim 1 wherein said means to receive comprises a plenum chamber adjacent the breech end.

3. A multi-store launcher as described in claim 1 wherein said flow means comprises a plurality of tubes.

4. A multi-store launcher as described in claim 1 wherein said firing pin means comprises a plurality of projectiles releasingly held by stop means at an entrance to said flow means, with said stop means connected to a plurality of cap means biased to securely cover each said flow means upon failure of each said corresponding stop means.

5. A multi-store launcher as described in claim 4 wherein said stop means comprises a plurality of breakable shear pins, each containing a fault therein to ensure fracture thereof.

6. A multi-store launcher as described in claim 4 wherein said cap means comprises a plurality of lids each pivotably fixed adjacent a flow means to operate from an open position to a closed position.

7. A multi-store launcher as described in claim 1 wherein said gas discharge means comprises a cartridge containing barium styphnate.

8. A multi-store launcher as described in claim 1 wherein said container is tubular.

9. A multi-store launcher that uses pneumatic power supplied by a transporting vehicle to iniate a firing sequence to discharge at least one store therefrom, comprising:
   a tubular container with a breech end for connecting to a transporting vehicle and an oppositely disposed discharge end, and having a connector leading into said breech end for carrying pneumatically supplied gas from the vehicle;
   a plenum chamber inside said breech end adjacent said pipe, said chamber having at least one flow port in the bottom surface thereof with a spring-biased closure adjacent said port;
   a firing pin restrainingly mounted on a shear pin in said flow port;
   a gas-generating cartridge adjacent said firing pin; and
   a channel leading from said flow port to a store in said container.

* * * * *